No. 757,982. PATENTED APR. 19, 1904.
R. W. UHLIG.
TYPE WRITING MACHINE.
APPLICATION FILED JAN. 4, 1901. RENEWED DEC. 30, 1902.
NO MODEL.
5 SHEETS—SHEET 1.

WITNESSES:
Fred White
Thomas T. Wallace

INVENTOR:
Richard W. Uhlig,
By Attorneys,
Arthur C. Fraser & Co.

No. 757,982. PATENTED APR. 19, 1904.
R. W. UHLIG.
TYPE WRITING MACHINE.
APPLICATION FILED JAN. 4, 1901. RENEWED DEC. 30, 1902.
NO MODEL. 5 SHEETS—SHEET 2.

WITNESSES:
Fred White
Thomas F. Wallace

INVENTOR:
Richard W. Uhlig,
By Attorneys,

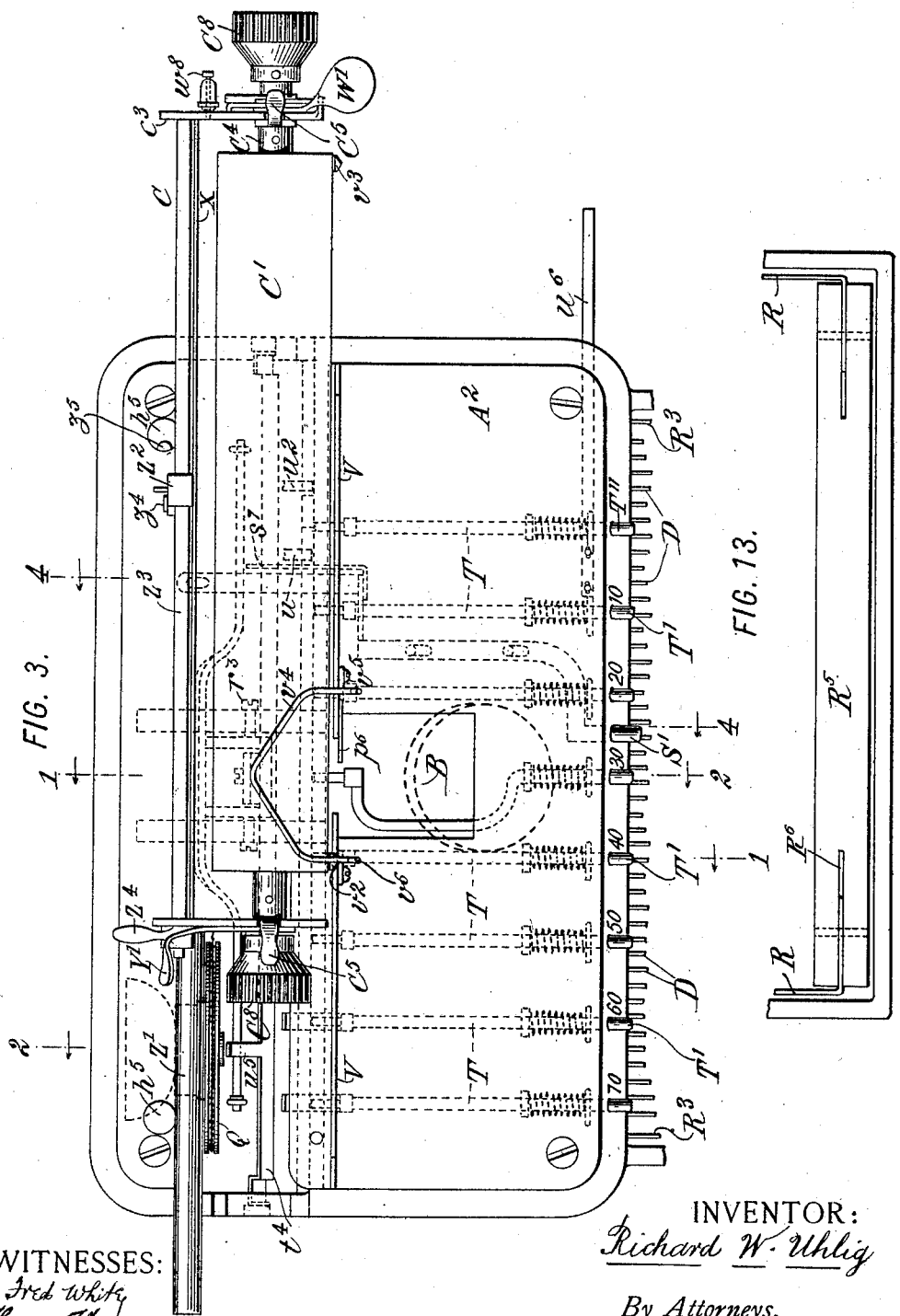

No. 757,982. PATENTED APR. 19, 1904.
R. W. UHLIG.
TYPE WRITING MACHINE.
APPLICATION FILED JAN. 4, 1901. RENEWED DEC. 30, 1902.
NO MODEL. 5 SHEETS—SHEET 4.
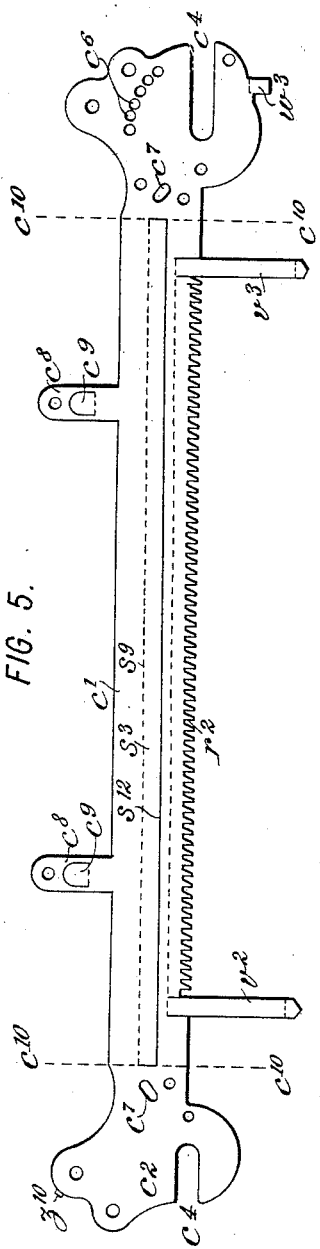
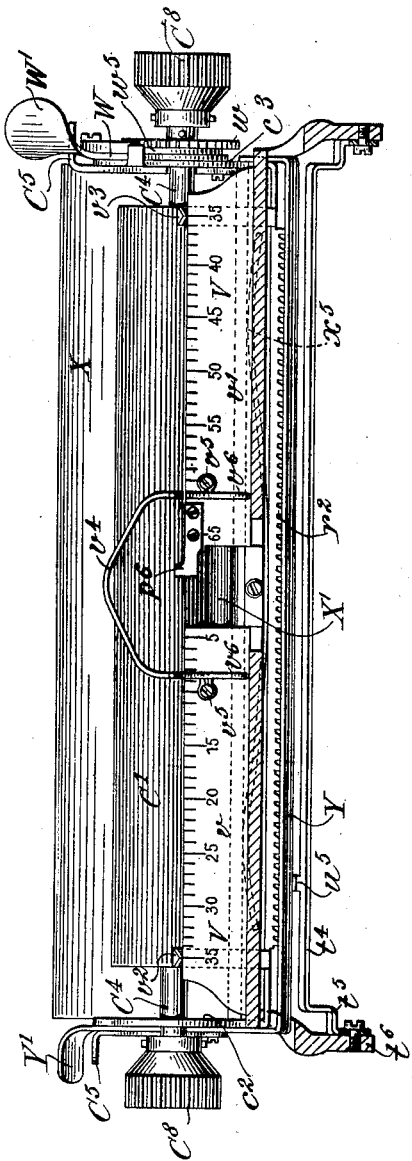
WITNESSES:
INVENTOR:
Richard W. Uhlig,
By Attorneys, No. 757,982. PATENTED APR. 19, 1904.
R. W. UHLIG.
TYPE WRITING MACHINE.
APPLICATION FILED JAN. 4, 1901. RENEWED DEC. 30, 1902.
NO MODEL. 5 SHEETS—SHEET 5.
FIG. 7.
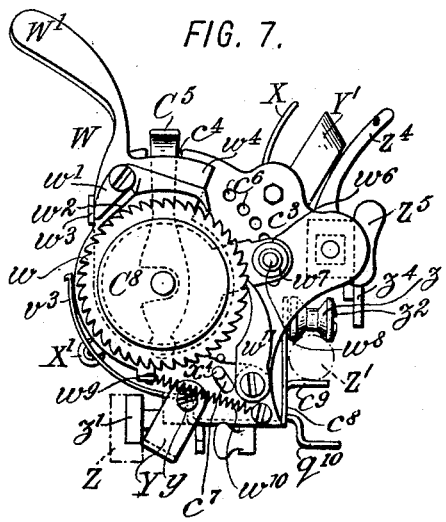
FIG. 8.
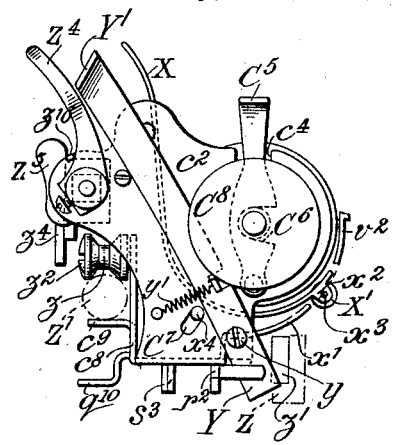
FIG. 9.
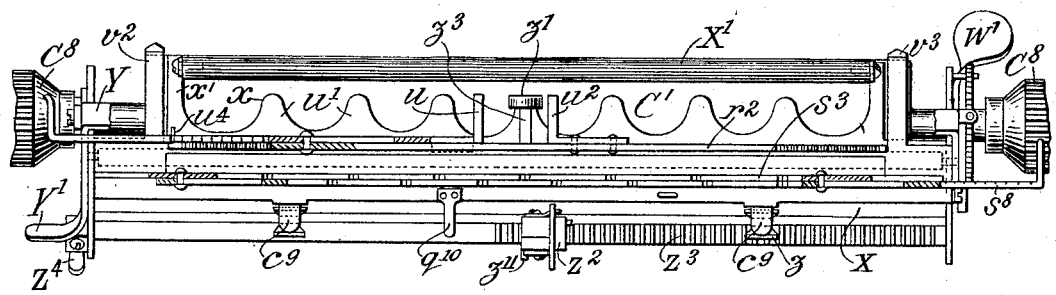
FIG. 10.
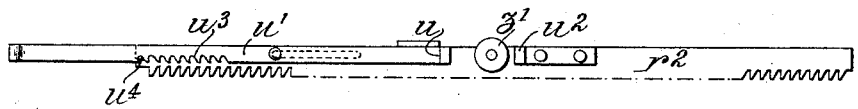
FIG. 11.
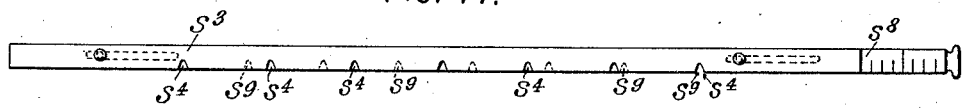
FIG. 12.
WITNESSES:
Fred White
Thomas F Walla[y]
INVENTOR:
Richard W. Uhlig,
By Attorneys,
Arthur C. Fraser & Co.

No. 757,982. Patented April 19, 1904.

UNITED STATES PATENT OFFICE.

RICHARD W. UHLIG, OF RUTHERFORD, NEW JERSEY, ASSIGNOR TO HENRY C. ADAMS, OF HACKENSACK, NEW JERSEY.

TYPE-WRITING MACHINE.

SPECIFICATION forming part of Letters Patent No. 757,982, dated April 19, 1904.

Original application filed March 29, 1900, Serial No. 10,614. Divided and this application filed January 4, 1901. Renewed December 30, 1902. Serial No. 137,209. (No model.)

*To all whom it may concern:*

Be it known that I, RICHARD W. UHLIG, a citizen of the United States, residing at Rutherford, in the county of Bergen and State of New Jersey, have invented certain new and useful Improvements in Type-Writing Machines, of which the following is a specification.

This invention was originally set forth in my application, Serial No. 10,614, filed March 29, 1900, of which the present application is a division.

This invention is directed to certain improvements in the carriage and its spacing mechanism, the line-locking mechanism, line-spacing mechanism, marginal stop, tabulating-stops, and carriage-release, which are particularly applicable to machines of the type-wheel class, although in most part applicable generally to those of the type-lever class.

The main object of my invention is to construct such mechanisms of very few parts which shall be simple, cheap, and durable and the assembling of which shall be readily accomplished with little or no adjustment, although my invention provides several constructions which involve what I believe to be novel modes of operation.

In the accompanying drawings I have shown the preferred form of my invention as applied to a machine of the type-wheel class, and in which—

Figure 1:
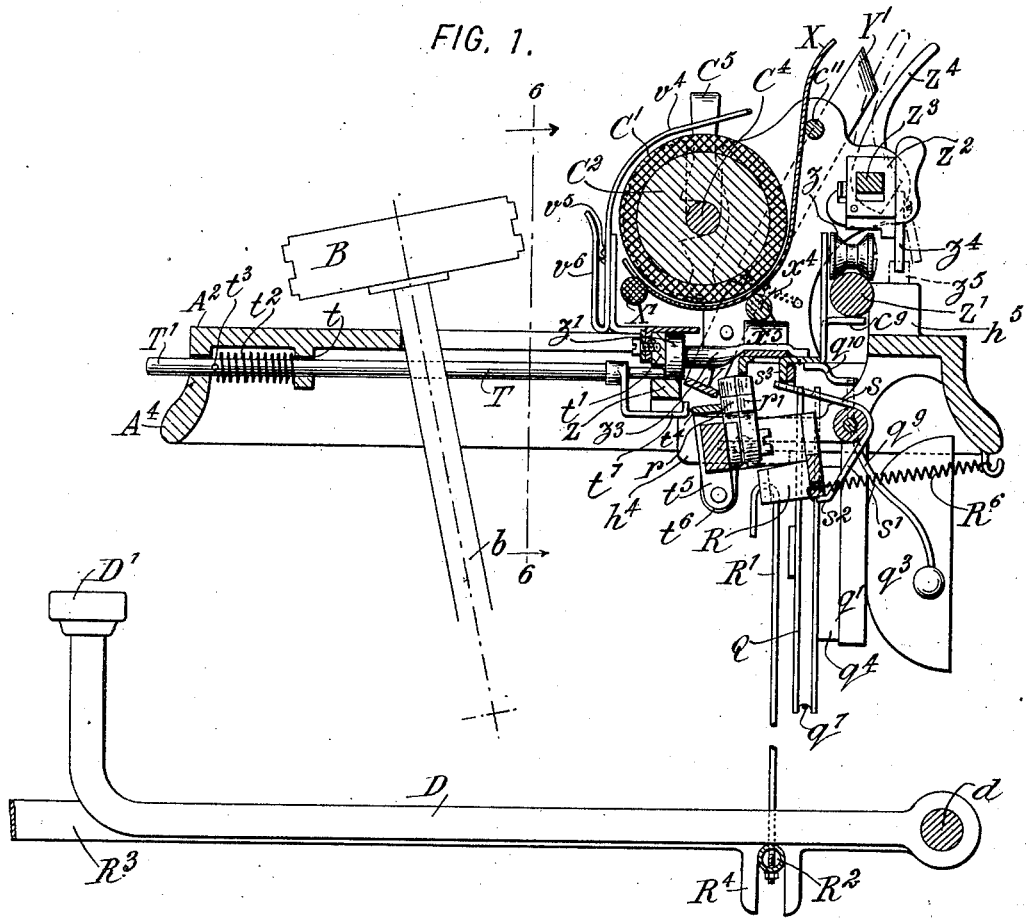
Figure 4:
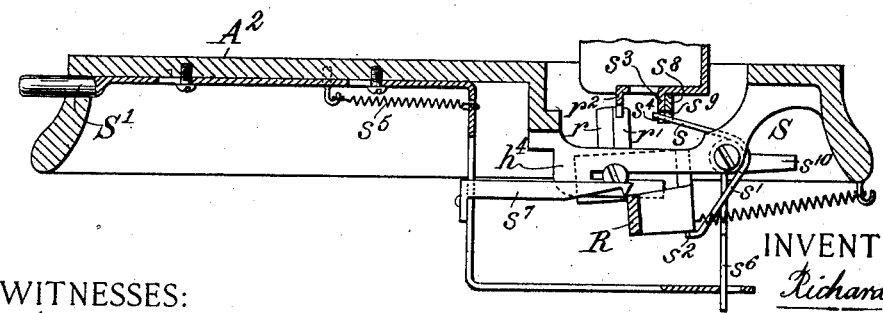
Figure 2:
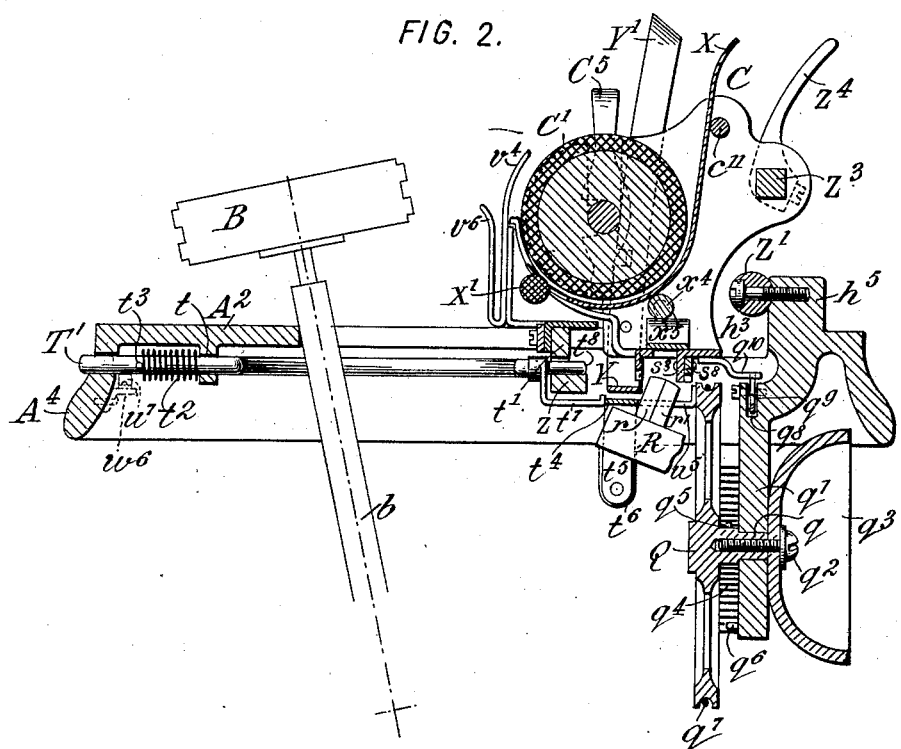
Figure 14:
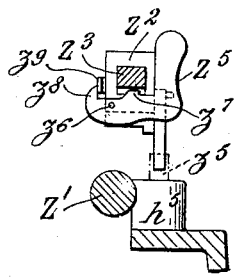
Figure 15:
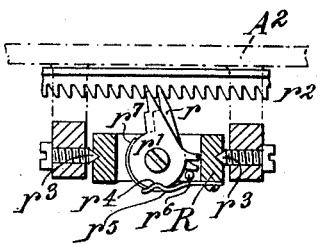

Figure 1 is a vertical section of the top plate, carriage, and carriage-controlling mechanism of a type-writing machine embodying my invention cut approximately on the line 1 1 in Fig. 3 and showing the parts in their normal or inactive positions. Fig. 2 is a similar section cut on the line 2 2 in Fig. 3 and showing the operating of the tabular-stops or the general carriage-release. Fig. 3 is a top or plan view of the machine, showing the top plate, carriage, and appurtenances, but omitting the keyboard. Fig. 4 is a vertical section cut approximately on the line 4 4 in Fig. 3 and illustrating in detail the line-locking mechanism. Fig. 5 is a plan of a blank from which the framework of the carriage may be constructed. Fig. 6 is a longitudinal vertical section cut on the line 6 6 in Fig. 1, showing the front of the carriage. Fig. 7 is an end elevation of the carriage looking from the right. Fig. 8 is a similar view looking from the left. Fig. 9 is an under side view of the carriage. Fig. 10 is a detail view of part of the margin-stop mechanism, the parts being shown in front elevation. Fig. 11 is a front elevation of a part of the line-locking mechanism. Fig. 12 is a detail in sectional elevation of the margin-stop lock. Fig. 13 is a detail of spacer-bar looking from beneath. Fig. 14 is a detail of the margin-stop, the parts being shown in vertical section. Fig. 15 is a longitudinal section of the dog-lever, showing the dogs in elevation.

In the drawings let $A^2$ indicate the top plate of a type-writing machine; B, the type-wheel, mounted upon a suitable frame or carrier $b$; C, the paper-carriage adapted to move transversely across the machine in a usual manner, and D the key-levers. As my present invention is not directed to improvements in the type-wheel or key-levers, these parts are not shown in detail. Those parts of the machine which illustrate the preferred embodiment of my invention I will now describe, for convenience referring to each group of mechanism under its appropriate heading.

*Feed mechanism.*—My invention provides certain minor improvements in the feed mechanism for the carriage, which comprises, as usual, a mainspring-wheel, which is connected to the carriage so that it exerts a constant tendency to move the latter from right to left, and a dog or dogs coöperating with a rack carried by the carriage to control the movements of the latter when the dog and rack are moved relatively to each other by the key or space levers through the medium of the usual universal bar. In the construction shown the rack is fixed against relative transverse movement and the dogs are connected to the universal bar to be oscillated thereby upon depression of a key These parts are in the main of the usual construction, but present certain features of improvement which I will now describe with reference to Figs. 1, 2, and 15.

I provide a mainspring-wheel Q, Fig. 2, which is formed on one side of its hub with a journal $q$, by means of which the wheel Q is mounted to rotate in a depending lug $q'$, formed integrally with the top plate $A^2$. The journal $q$ passes through a suitable hole formed in the lug $q'$ and is formed with a screw-threaded socket, into which is tapped a screw $q^2$, which also passes through a bell $q^3$, the single screw $q^2$ thus serving to mount both the bell and wheel Q in the lug $q'$. In the construction shown the bell $q^3$ is held firmly against the journal $q$, and thus rotates with the wheel Q. This rotation of the wheel is of course immaterial, being merely an incident to the construction shown. The mainspring $q^4$ encircles the hub of the wheel Q, being fixed at its inner end to a projection $q^5$, carried by the hub, and at its outer end to a projection $q^6$, carried by the lug $q'$. The wheel Q has a peripheral groove forming a guide for the usual cord or chain $q^7$, which is fixed at one end to the periphery of the wheel and at its other end to the carriage C, as is common. To vary the tension upon the carriage, the cord $q^7$ is passed around the wheel Q in such manner as to give it a complete rotation either to increase or decrease the tension of the spring, when the cord may be again adjusted in its guiding-groove. The lug $q'$ is slotted at $q^8$, as shown in Fig. 2, to receive the upper end of the bell-hammer $q^9$, (shown in Fig. 1,) which is fulcrumed in said slot so that its upper end extends into the path of a projection $q^{10}$ upon the carriage C, which engages the bell-hammer at the proper time.

For controlling the movement of the carriage against the tension of the mainspring I prefer to employ a pair of dogs $r$ $r'$, Figs. 1, 2, and 15, pivoted to the top plate $A^2$, and a longitudinal rack $r^2$, fixed to the carriage. These dogs $r$ $r'$ operate in the usual manner, the one $r$ being fixed against oscillation in one direction and the other, $r'$, being capable of oscillation in opposite directions. Both dogs are in the construction shown horizontally pivoted to a vibrating dog-lever R, which is fulcrumed between screws $r^3$ in lugs formed on the top plate, as shown in Fig. 15 and in dotted lines in Figs. 2 and 3. The ends of the lever R are connected by suitable rods R' to a universal bar $R^2$, arranged in the path of movement of the type-levers. The lever R is moved by these levers against the tension of its spring $R^6$, as usual. I form one of the dogs—for instance, $r'$—at its under side with a depression or notch $r^4$, and I fix to the lever R a flat spring $r^5$, which is bent at one end to engage the notch $r^4$, (best seen in Fig. 15,) so that the dog may move against the tension of the spring, either against the stop $r^6$ during the normal operation of the dog or may tilt in an opposite direction to allow the rack $r^2$ to move past it when the carriage C is moved to the right to its initial position. The dog may, if desired, be formed with a projection and the spring with a reciprocal bent portion or notch to effect this same result. A single flat spring thus suffices to effectively actuate the movable dog $r'$, with a considerable gain in simplicity and cost. The second dog $r$ is held yieldingly against the stop $r^6$ by a flat spring $r^7$, which at one end passes partially around the dog and at the other end is fixed to the lever R.

The universal bar $R^2$ in the construction extends transversely beneath both series of key-levers and the spacer-levers $R^3$, the latter being formed at their under sides with lugs $R^4$ for holding the universal bar in its proper position. The bar $R^2$ is preferably formed as a tube, having holes at each end, which are adapted to receive the ends of the rods R', the latter being adjustably held to the bar by suitable set-nuts, as shown in Fig. 1. The universal bar is equidistant from the under faces of each of the key-levers D and spacer-levers $R^3$, so that a predetermined depression of any of these levers results in the forward feed of the carriage. The spacer-levers $R^3$ are preferably fulcrumed at their rear ends upon the fulcrum $d$ and at their front ends are preferably bent angularly, as shown, and the spacer-bar $R^5$ is formed with longitudinal slots $R^6$ at its under side, as clearly shown in Fig. 13, which fit over the bent ends of the spacer-levers $R^3$, thus making a simple and effective connection between the spacer-bar and its levers. Set screws or pins passing through the bar and levers may be provided, as shown in dotted lines, to insure against separation of these parts.

*Line-locking mechanism.*—It is desirable that the printing mechanism be locked at or near the end of the line, so that several characters cannot inadvertently be printed one upon the other. My invention provides a novel means for accomplishing this result and also certain improvements in such mechanism whereby the line-locking device may be rapidly adjusted to operate at one or another point in the movement of the carriage. I will describe the means shown for stopping the carriage and locking the printing mechanism at the end of the line with reference to Figs. 4 and 11. At the rear of the frame near its middle is pivoted a detent S, which consists of two arms $s$ $s'$, the latter of which is formed at its lower end with a hook $s^2$, adapted to engage the lever R. A plate $s^3$ is fixed to the under side of the carriage C and acts normally against the arm $s$ to hold the arm $s'$ out of engagement with the lever R. The plate $s^3$ carries a suitable stop, which in the construction shown comprises a notch $s^4$, into which the arm $s$ may enter, whereupon the arm $s'$ moves into engagement with the lever R. This locks each of the key-levers against the universal bar $R^2$, thus preventing these levers from moving downwardly to elevate the type-bars when my invention is applied to a type-lever machine or to rotate the type-wheel or type-carrier in the case of this class of machine. As the lever R is held against downward movement by the detent S, this lever cannot be vibrated to move the dogs $r$ $r'$, and hence the carriage is locked against further movement to the left. The line-locking mechanism may be released to allow the printing of an additional character or characters by an unlocking device S', extending to the front part of the machine, which I will now describe with reference to Fig. 4. The unlocking device S' comprises a movable rod or plate sliding along the under side of the top plate $A^2$ and normally held inoperative by a spring $s^5$, which holds the plate in its retracted position. The inner end of the latter extends below the lever R, as shown, and engages an arm $s^6$, fixed to the detent S. When the line-locking device has operated and it is desired to print an additional character or characters, the unlocking device S' is pressed in, with the effect that the detent S is tilted by its arm $s^6$, so that the hook $s^2$ is moved from engagement with the lever R, leaving the latter free to vibrate and unlocking the universal bar $R^2$, so that the latter may be moved by the depression of a key-lever to oscillate the feed-dogs and permit the printing of an additional character. When the detent S is tilted, the arm $s$ moves from engagement with the notch $s^4$ in the plate $s^3$ and remains out of engagement therewith so long as the unlocking device S' is held pressed in. If, however, with the mechanism thus far described the unlocking device were released and retracted by its spring $s^5$, before another movement of the carriage took place the arm $s$ would again move to engage the notch $s^4$ and the parts would be again locked. This would necessitate holding the unlocking device S' pressed in while the next character was being printed, thus permitting the carriage to feed forward a space to move the notch $s^4$ out of coincidence with the arm $s$. To avoid this necessity, I provide means for holding the unlocking device in its displaced position until the carriage has been moved by the depression of a key or space lever to sufficient extent to prevent reëngagement of the arm $s$ with the notch $s^4$, a movement of one space being ordinarily sufficient to effect this result. I hence provide a catch $s^7$, fixed to the unlocking device, which when the latter is pressed in is adapted to move into engagement with any suitable part which partakes of the movements of the universal bar. In the construction shown I conveniently utilize the dog-lever R and form the catch $s^7$ with a hooked outer end, which is adapted to engage the upper side of the lever R when the unlocking device S' is displaced. By this means the unlocking device is held in its displaced position and the detent S is held in inoperative position until the next succeeding movement of a key or space lever has fed the carriage forward a single space, whereupon the lever R moves out of engagement with the catch $s^7$ and the unlocking device S' is permitted to move under the tension of its spring $s^5$ to its retracted or inoperative position. The arm $s'$ is shown as provided with a weight $s^{10}$ for causing the detent to engage, or a suitable spring may be used for this purpose. If but one line-lock stop-notch $s^4$ is used, the detent S is held in inoperative position by the lower face of the plate $s^3$ until the carriage is finally stopped by reaching the limit of its movement. The notch or notches $s^4$ are so formed that upon movement of the carriage to the right to its initial position for starting a new line the arm $s$ of the detent S may ride into and out of engagement therewith. During this movement when such engagement takes place the detent S will momentarily act to lock the dogs; but this is of no consequence.

It is to be understood that as many line-lock notches $s^4$ may be used as are desired or as are convenient in particular kinds of work. I prefer, however, to form a plurality of such stop-notches in the plate $s^3$ and to provide means whereby one or more of these notches may be maintained in operative position, this feature being seen in Fig. 11, which shows the plate $s^3$ detached. This is accomplished in the construction shown by forming a series of notches in the plate $s^3$, said notches being spaced apart equidistantly or otherwise, and providing a second plate $s^8$, which is adapted to slide along the plate $s^3$ to close or open one or more of the notches of the latter. In the form shown the plate $s^8$ is formed with a corresponding series of notches $s^9$, arranged with reference to the notches $s^4$ according to the vernier method, whereby a comparatively small movement of the sliding plate $s^8$ will result in bringing some one of its notches $s^9$ into coincidence with any one of the notches $s^4$ that it may be desired to use. One of the plates may be provided with graduations, as shown on the plate $s^8$, to indicate the movement necessary to bring a certain notch into operation. This device is well adapted for use where a considerable number of line-locking notches are to be employed arranged some distance apart across the carriage, as it enables the rapid adjustment of the line-locking point by means which need not extend unduly beyond the side of the carriage, which latter would be the case were the sliding plate $s^8$ formed with a single notch adapted to be brought successively into alinement with the several notches $s^4$. Where the notches are to be grouped close together at one end of the plate $s^3$, the vernier arrangement is rendered unnecessary, and the device last referred to may be employed. It will be understood that with either of these arrangements any convenient number of notches may be coincidentally brought into operation, this being merely a matter of formation of the plates $s^3$ and $s^8$. The device may be thrown entirely out of operation by moving the plate $s^8$ a short distance to the right, so that none of its notches coincide with those of the plate $s^3$.

*Tabular stops.*—My invention provides a tabular-stop mechanism of extreme simplicity and efficiency by which the carriage is released from its engagement with the feed-dogs and is caused to jump or skip quickly to a certain point corresponding to the stop actuated and there arrested, its reëngagement with the dogs occurring upon the release of the stop. My invention further provides certain improvements in tabular stops whereby the same stop may be operated to release the carriage and to arrest it when it is moving in the normal direction and also to arrest the carriage in such manner as to act as a marginal stop when the carriage is being moved in the reverse direction for beginning a line. My invention also provides means whereby such a stop may be locked in the path of the carriage to act as a fixed right or left hand marginal stop. The tabular-stop mechanism is best shown in Figs. 1, 2, 3, and 12.

As shown in dotted lines in Fig. 3, the stops T are seven in number (although any suitable number may be employed) and are spaced equidistantly along the under side of the top plate $A^2$ to stop the carriage at certain points in its path of movement, preferably at every tenth space. An additional stop $T^{11}$ is added to the right of the stops T and is adapted in the construction shown solely for use as a margin-stop, as hereinafter described. Each stop T is formed with or carries at its front end a handle or button T', which projects through the depending flange $A^4$ of the top plate, so that it may be conveniently manipulated by the operator. As shown, each of the stops T comprises a longitudinally-movable bar or rod fitted to slide in front and rear bearing lugs or flanges $t$ $t'$, respectively, formed in the top plate, as shown in Figs. 1 and 2. A spring $t^2$, encircling each stop T between the flanges $A^4$ and $t$, acts against a pin $t^3$ to normally hold the stop in its protruded position. In order to produce the desired operation of the stops T in a machine of the character shown, it is necessary to disengage the feed-dogs from the feed-rack, so that the carriage may be free to move under the tension of its spring until arrested by the stop. To accomplish this, I provide a plate $t^4$, Figs. 2 and 6, which extends transversely of the machine in front of the dogs $r$ $r'$, said plate being preferably bent at its ends to form arms $t^5$, which latter are pivoted to lugs $t^6$, formed integrally with the top plate $A^2$, at each side thereof. The plate is thus capable of being tilted rearwardly to move the dogs $r$ $r'$ out of engagement with the rack $r^2$, but normally lies forwardly of the dogs, so that it has no effect to interfere with their movements, as shown in Fig. 1. Each of the stops T carries at its rear an arm $t^7$, which is bent angularly, so that it passes beneath the rear bearing-plate $t'$ in position to engage the pivoted or tilting plate $t^5$ when the stop is displaced. The arm $t^7$ thus acts when the stop is moved rearwardly to tilt the plate $t^5$ into engagement with the dogs $r$ $r'$, as best seen in Fig. 2, and move the latter rearwardly out of engagement with the rack $r^2$, thus releasing the carriage from the restraint of the dogs and permitting it to move under the tension of its spring until arrested by a stop projection $t^8$, which is simultaneously interposed in its path of movement. This stop projection $t^8$ may be formed in any suitable manner, but conveniently comprises the end of the stop T, which when the stop is pressed back projects through the flange $t'$ a sufficient distance to form an obstruction in the path of movement of the carriage. This projection may engage any suitable stop-face upon the carriage—as, for instance, that shown at $u$, Figs. 9 and 10, which comprises a block fixed to the carriage at about its longitudinal center and so formed as to engage the stop projection $t^8$ of any of the stops T when the latter is projected in its path. The operation of such tubular stops is well known and consists merely in pressing the button T' to release the carriage and holding it in until the carriage is arrested. Upon release of the stop its spring $t^2$ acts to move it outwardly, thus allowing the dog-lever R to move under the tension of its spring to again engage the feed-dogs with their rack and hold the carriage in its arrested position until moved by a space or key lever.

My invention provides a novel arrangement and construction of tabular stops, in that I may simultaneously vary the points of action of the series of tabular stops so that they will act to arrest the carriage at points which may vary from the normal or indicated positions. To effect this, I make the stop-face $u$ movable longitudinally relatively to the carriage and preferably provide an operating arm or slide $u'$, extending to one end of the carriage, where it may be conveniently manipulated, and means for adjusting this arm so as to fix the stop-face $u$ in its different positions. The slide or arm $u'$ may be conveniently mounted upon the feed-rack $r^2$, as shown in Fig. 10, so that the stop-face $u$ may be adjustable longitudinally of the rack at the left of the front roll $z'$. The slide $u'$ may have a series of notches $u^3$, which are adapted to be engaged by a pin or projection $u^4$, fixed to the rack, and the slide in this case is preferably of sufficient elasticity to spring upwardly, so that any one of its notches may engage with the pin. The stop-face $u$ preferably has a movement equal to the distance between two adjacent tabular stops, in the construction shown this movement consisting of ten spaces. By this means the entire series of tabular stops which normally operate at 10 20 30, &c., respectively, may be made to operate at 11 21 31, &c., or at 15 25 35, &c., or at other suitable points in the path of movement of the carriage.

I preferably provide a brake for braking the carriage during the operation of the tabular stops and preferably so construct the brake that the braking pressure will be under control of the operator and be variable according as the tabular stops are pressed with more or less force. As shown in the present construction, I fix a brake-shoe $u^5$, Figs. 2 and 6, to the tilting plate $t^4$ in such manner that it will engage the periphery of the mainspring-wheel Q when the plate $t^4$ is tilted rearwardly by the action of the arms $t^7$, as seen in Fig. 2. Upon release of any tabular stop the brake $u^5$ is released, the tilting plate $t^4$ moving to its inoperative position. (Shown in Fig. 1.) In this figure the brake is omitted to avoid confusion.

Each of the stops T' is, according to my present invention, adapted to operate as a marginal stop, this being effected in the present construction by the use of a second stop-face $u^2$, Figs. 9 and 10. When used as a marginal stop, the selected stop T' will be pressed with one hand while the carriage is being moved to the right with the other, and upon engagement of the stop-face $u^2$ with the stop the latter may be released, the carriage being held in the selected position by reëngagement of the feed-dogs with the feed-rack. I have shown the second stop-face $u^2$ as fixed, although it may, if desired, be made adjustable in the manner described with reference to the stop-face $u$ or otherwise.

The stop-face $u^2$ is so mounted upon the carriage that when the tabular stops are operated as marginal stops the carriage is arrested at a point ten spaces farther to the left than is indicated by the numbers of the stops. Thus the first stop T' (marked 10) acts to arrest the carriage at the point 20. The stop $T^{11}$, while identical in construction with the stops T', is so located upon the machine, as shown in Fig. 3, that it can be used only as a marginal stop. Being so used, it acts to arrest the carriage at the tenth space from the right.

I preferably provide means for locking one or more of the tabular stops in position, so that they may be used as stationary marginal stops. In Figs. 2, 3, and 12 I have shown a device suitable for this purpose, which comprises an angular plate $u^6$, adapted to slide along the under side of the top plate, and which carries a spring $u^7$, adapted to frictionally engage the under side of one or another of the stops T when the latter is displaced. The inner stop-faces $t^8$ of the stops T in this construction are made with such degree of projection that they are moved into the path of the stop $u$ before the arm acts to throw the dogs out of engagement, and hence limit the movements of the carriage to the right, while still permitting its feed mechanism to operate. While in the drawings I have shown the last-named locking mechanism as adapted to lock only the two right-hand tabular stops T, (exclusive of the stop $T^{11}$,) it is obvious that means may be provided for locking any one of the stops, although it will not ordinarily be necessary to provide means for locking the stops at the left-hand side of the machine.

In a type-writing machine of the construction shown in order to not interfere with the swinging movement of the frame or other support for the type-wheel $b$ I bend one of the stops (that indicated at 32, Fig. 30) so as to pass around the frame, this being clearly shown in Figs. 2 and 3.

*The carriage.*—My invention aims to provide a carriage of the utmost simplicity of construction which will be strong and durable and which will be capable of performing all of the modern requirements—that is to say, one in which the paper is accurately guided to the platen and held thereon, in which the line-spacing mechanism is capable of varied adjustments to feed the paper a greater or less extent at each operation, in which a general carriage-release is present, by means of which the feed mechanism is thrown out of operation, so that the carriage may be freely moved in either direction, and in which means are provided for passing to a position to the right of that set by the ordinary margin-stop when desired, so that the beginning of the writing-line on the paper may be advanced to the left. The carriage embodying my present invention is partly shown in Figs. 1 and 2 and in detail in Figs. 5 to 9. The main frame of the carriage C, as shown in Fig. 5, is formed of a single piece of sheet metal, the bottom plate $c'$ having formed integrally therewith the feed-rack $r^2$, the line-lock plate $s^3$, and other accessory parts which will be specifically referred to. In constructing the frame of the carriage a suitable rectangular plate, of sheet iron or steel, is stamped to substantially the form shown in Fig. 5. The rack $r^2$ is formed upon the inner edge of the blank, as shown, and after its teeth have been milled or otherwise cut the rack is bent at an angle to the plate $c'$. This plate is cut along the line $s^{12}$, leaving a longitudinal plate or tongue which is bent at $s^9$ to form the line-lock plate $s^3$. At the ends of the plate $c'$ are formed enlarged portions $c^2$ $c^3$, which after the rack is formed are bent up at right angles on the lines $c^{10}$ $c^{10}$ and serve to form bearings for the platen C', the line-spacing, margin-stop, and general carriage-release mechanisms. The end portions $c^2$ $c^3$ are formed with notches or recesses $c^4$, into which the shaft of the platen fits and through which the latter may be inserted and removed to substitute one platen for another. The end portion $c^3$ is formed with a series of recesses or holes $c^6$, which are adapted to be engaged by a stop for adjusting the limits of movement of the line-spacing mechanism. Both end portions $c^2 c^3$ are formed with notches $c^7$, which when these portions are bent to shape serve to limit the movements of the paper-guide device. At rear of the frame $c'$ are formed projecting tongues $c^8$, which serve to mount the rear carriage-rollers, and these tongues are in turn formed with lips $c^9$, which are bent angularly to hold the carriage to its guide-rod, as will be described. At the front of the frame $c'$ are formed two projections or tongues $v^2 v^3$, which serve as pointers for moving along a graduated scale to indicate the position of the carriage. The end portions $c^2$ $c^3$ when bent to shape are connected by a strengthening rod or brace $c^{11}$, Figs. 1 and 2.

I will now describe the carriage in detail. The platen $C'$, Fig. 1, preferably comprises a roller, of wood or other suitable material, $C^2$, which has a rubber facing $C^3$, molded or otherwise fixed in place in any well-known manner. The roller $C^2$ has fixed at each end suitable pins or shafts $C^4$, which are adapted to fit in the notches or recesses $c^4$ of the frame so that they project beyond the ends thereof, and the frame is provided at each end with a catch $C^5$, Figs. 6 to 8, which catches are pivoted at their lower ends to the angular end portions $c^2 c^3$ and are formed with notches $C^6$, which when the catches are moved to the vertical position (best seen in Figs. 7 and 8) engage the pivots or shafts $C^4$ of the platen and hold the same firmly in position. When it is desired to remove a platen, the catches $C^5$ are swung backwardly until their notches clear the shaft $C^4$, when the platen may be lifted out. The platen is preferably provided with usual knobs $C^8$, which are fixed to the shafts $C^4$ and serve to turn the platen independently of the line-spacing mechanism, which I will now describe with reference to Figs. 6 and 7.

To one of the shafts $C^4$ is fixed a ratchet-wheel $w$, and mounted upon this same shaft and free to turn thereon is a line-spacing lever W, which is preferably formed as a plate of circular shape provided with a suitable operating-handle $W'$. Pivoted to the plate W is a spring-pawl $w'$, which is normally held in engagement with the teeth of the ratchet-wheel $w$. A stop $w^3$, bent up from the angular end plate $c^3$ of the frame, serves to limit the rearward movement of the plate W. The plate W is confined between the angular end plate $c^3$ and a stop device $w^5$. This latter is formed as a circular plate pivotally mounted upon the shaft $C^4$ and is formed with an arm $w^6$, which latter carries a spring handle or knob $w^7$, which has fixed to it a stop-pin $w^8$, adapted to enter one or another of the holes or recesses $c^6$, formed in the angular end plate $c^3$. (See dotted lines in Fig. 3.) These recesses, as shown in Fig. 7, are arranged in the arc of a circle of which the shaft $C^4$ is the center, and the stop device $w^5$, fulcrumed at this center, may be moved to engage any of the recesses $c^6$, so that it constitutes an adjustable stop in the path of movement of a stop-shoulder $w^4$, formed on the plate W. The plate W is formed at its under side with a projection $w^9$, to which is attached one end of a spring $w^{10}$, the other end of the latter being fixed to the angular plate $c^3$. This spring serves to retract the lever $W'$, with its pawl $w'$, after the latter has been moved to rotate the platen to feed the paper. During the retraction of the lever $W'$ the platen is held against rotation therewith by a pawl $w^{11}$, pivoted to the end plate $c^3$, which acts against the ratchet $w$, as shown in Fig. 7.

I provide for the carriage improved means for guiding the paper to the platen and holding it against the latter, this consisting, as shown, of a guiding-plate X, Figs. 1 and 8, extending above the top face of the platen, partly encircling the platen at its under side, and formed at its front side with a series of spring-fingers $x$, Fig. 9, which are designed to lightly contact with the platen for holding the paper thereto. I preferably provide a paper-roll $X'$, which extends longitudinally of the platen near the printing-line, and to provide supporting-points for this roll I form two of the fingers $x$, preferably those at the ends of the carriage, so that they extend beyond their fellows, and upon each of these fingers (designated by the reference-letters $x'$, Fig. 8) I form a lug $x^2$, which projects angularly therefrom. The lugs $x^2$ are formed with suitable holes to receive pins $x^3$, which are fixed to the ends of the roll $X'$, so that the latter may rotate in the bearings thus formed. To hold the platen X with its fingers $x$ and roller $X'$ in position, I fix to the under side of the plate a rod or bar $x^4$, Figs. 1 and 2, which is formed with reduced ends fitting in the slots $c^7$, formed in the end plates $c^2 c^3$ of the carriage, as shown. For holding the plate X and its roller yieldingly against the platen I provide a spring $x^5$, Fig. 1, which is shown (see dotted lines, Fig. 6) as a flat bow-spring bearing against the rod $x^4$ at its ends, with its middle resting upon the main plate $c'$ of the carriage. This single spring suffices in the construction shown to hold the paper firmly in position between the plate X and roll $X'$ and the platen $C'$. As the rod $x^4$ may move in its slots $c^7$ against the tension of the spring $x^5$, the carriage may accommodate paper of different thicknesses or a number of sheets, thus fitting the machine for manifold work.

My invention provides a simple and efficient general carriage-release which acts to move the feed-dogs out of engagement with the feed-rack, whereby the carriage may be moved in either direction for setting it at a desired position in a usual manner. This device is shown as a movable bar or plate Y, pivoted at $y$ to the end plates $c^2 c^3$ of the carriage in such manner that it extends longitudinally of the carriage below the lower plate $c'$ thereof, as best seen in Figs. 6, 7, and 8. One end of the plate Y is continued above its pivotal point $y$ and is formed as a handle Y'. A spring $y'$, Fig. 40, fixed at one end to the handle Y' and at its other end to the end plate $c^2$ of the carriage, serves to hold the plate Y in its retracted or inoperative position. In this position it is normally held out of contact with the feed-dogs $r\ r'$, as shown in Fig. 1. When it is desired to release the carriage, the handle Y' is moved forwardly, whereupon the plate Y moves back and acts to move the feed-dogs out of engagement with the feed-rack, thus releasing the carriage and permitting its movement in either direction to the desired point. As the plate Y extends the entire length of the feed-rack, it will be understood that in no matter what position of the carriage the general release may operate, as thus described, when the handle Y' is released its spring $y'$ acts to move the plate Y out of engagement with the dogs, which thereupon return to their normal position in engagement with the feed-rack.

The carriage may be mounted to move upon the frame in any suitable manner; but I prefer that the top plate $A^2$ carry or be formed with two suitable guides Z Z', the front guide Z, Fig. 1, being shown as a way formed integrally with the top plate and the rear guide Z' being shown as a bar screwed or otherwise secured to said plate. These guides are shown in Figs. 1 and 2 in full lines and in dotted lines in Figs. 7 and 8. I preferably provide the carriage with two bearing rolls or wheels $z$ at rear and a single roll $z'$ at front. To form suitable supporting means for the roll $z$, I form tongues $c^8\ c^8$ (shown in Fig. 5) and subsequently bend these at an angle to the bottom plate $c'$, as shown in Figs. 7 and 8. The rolls $z$ are mounted upon these tongues $c^8$ by means of suitable pivot pins or screws $z^2$, the inner ends of which are fixed in any suitable manner to the tongues, as by screw-threads or otherwise. The lips $c^9$ of the tongues $c^8$ are bent angularly to the latter in such manner that they extend beneath the guide-rod Z' and hold the carriage against vertical movement relatively thereto. The front guide-roll $z'$ is mounted to rotate upon a shaft $z^3$, which is riveted or otherwise fixed to the front side of the bottom plate $c'$ of the carriage.

My invention provides a simple and efficient marginal stop for the carriage, which is shown as adjustable on the latter and adapted to move against a fixed abutment upon the top plate. This stop mechanism comprises a block $Z^2$, Figs. 1, 3, and 9, adapted to slide along a notched bar $Z^3$, which is mounted at its ends in the end plates $c^2\ c^3$ of the carriage-frame in such manner that it may oscillate therein. The block $Z^2$ is provided with a catch $z^4$, formed on the top plate $A^2$. A suitable stop pin or shoulder $z^{11}$, Fig. 9, is formed upon the block $Z^2$, which prevents the catch $z^4$ from yielding during retraction of the carriage, and the catch thus serves to limit the movement of the carriage upon engagement with the shoulder $z^5$. The rod $Z^3$ has fixed to it at one end an operating-handle $Z^4$, by which it can be oscillated, as shown in dotted lines in Fig. 1, thus moving the block $Z^2$ to such extent that the catch $z^4$ passes outwardly of the shoulder $z^5$ and allows a free movement of the carriage to the right. Two stops $z^{10}$, Fig. 8, fixed to the end plates $c^2$, may be provided for limiting the movement of the handle $Z^4$. This construction is useful when it is desired to ordinarily begin a line at a certain fixed point, but to occasionally move to the right of this point to insert a marginal number, &c., it is desirable that the margin-stop shall be adjustable, so that the carriage may be stopped during its retraction at any desired point. In the present construction I effect this by notching the under side of the rod $Z^3$ and providing the block $Z^2$ with a spring catch-lever $Z^5$, which is best shown in Fig. 14. This lever $Z^5$ is preferably angular, as shown, and is pivoted at $z^6$ near its front end to the block $Z^2$. It is formed rearwardly of its pivotal point with a tooth $z^7$, adapted to enter any of the notches of the bar $Z^3$ to hold the block $Z^2$ in its adjusted position. At its front end it is formed with a toe $z^8$, and between this toe and the face of the block $Z^2$ is interposed a flat spring $z^9$, which normally holds the spring-lever $Z^5$ in its operative engaging position. To adjust the stopping-point of the carriage, the lever $Z^5$ is depressed, thus bringing its tooth $z^7$ out of engagement with the notched bar and moving the block along the bar to the desired position. When the lever is released, its spring $z^9$ causes the tooth $z^7$ to enter that notch with which it is then in alinement. I do not herein claim those features of my invention which relate to the general construction of the main frame of the carriage, as these form the subject-matter of a divisional application hereof, filed June 6, 1903, Serial No. 160,306.

*The frame.*—My invention also presents certain improvements in the frame, top plate, scale, &c., which I will now describe.

At the rear the top plate is formed with a large transverse slot $h^3$, Fig. 2, within which the carriage C moves, and crossing this slot and depending below the main portion of the top plate are two bearing-bridges $h^4$, Fig. 1, to which the dog feed-lever R is fulcrumed. The flange $t'$, which serves as a bearing for the tabular stops, is formed integrally with the top plate along the front side of the slot $h^3$, and the front guideway or path Z for the front carriage-roller is formed as a part of the flange $t'$, extending angularly thereto in a horizontal plane. At the rear of the top plate are formed two or more lugs $h^5$, to which the guide-rod Z' for the carriage is directly fixed by screws or otherwise, as shown in Fig. 2. The top plate thus serves to support the carriage, the feed-dogs and feed-lever, the mainspring-wheel, the bell, the marginal stop, the line-locking mechanism, and the tabular stops. These parts may thus be removed from the machine by merely removing the plate. This may be done by removing the type-wheel and detaching the links R' from the feed-lever R.

In the construction of type-writing machines herein shown I prefer to use a single scale, which may be graduated upon a scale-plate V. (Shown as fixed to the top plate $A^2$ and best seen in Fig. 6.) This scale-plate is shown as comprising two portions $v$ $v'$, the one, $v$, coöperating with the pointer $v^2$ during the first half of the complete movement of the carriage and the other, $v'$, coöperating with the pointer $v^3$ during the second half of the movement of the carriage. The portion $v$ of the scale-plate V is therefore provided with graduations beginning at the middle of the machine and reading toward the left, and the portion $v'$ has graduations beginning at its right and preferably with the last number ("35") of the graduations of the portion $v$ and reading in the same direction. In the example shown it is assumed that the carriage has an extreme movement of seventy spaces, and hence the portion $v$ is graduated from "1" to "35," ("1" to "3" being omitted, because the inner ends of both portions of the scale-plate are cut away to permit the movement of the type-wheel to the printing position.) The portion $v'$ is graduated in the same direction from "35" to "70." The pointer $v^2$ thus serves to indicate the positions of the carriage from "1" to "35," and the pointer $v^3$ indicates its positions from "35" to "70." It is not necessary to use a scale in my present machine for determining the printing-point, as a plate $p^6$ may be used as a pointer for indicating the position to which any desired point upon the paper should be brought when it is desired to print a character at such point. The upper edge of the scale V serves as a straight edge for correctly adjusting the paper or for finding the writing-line. The upper edges of the pointers $v^2$ $v^3$ may also serve as adjusting-points for the paper.

I preferably provide an additional paper-guide at the front side of the platen, so that the paper may be held about the platen at the printing-point. In the construction shown this comprises a loop or semicircle of wire $v^4$, fixed to the scale-plate by screws $v^5$ and curved rearwardly, so that it extends partially around the platen. This insures that the paper will be held closely against the platen while at the printing position, since the paper-guide $v^4$ is stationary and acts upon that part of the paper which is then opposite the type-wheel.

It is frequently necessary to make corrections in manifold copies, and heretofore, so far as I am aware, no means have been provided for supporting a sheet of carbon-paper in position between the printing mechanism and the platen. I therefore provide a holder which may be conveniently utilized for supporting a slip of carbon-paper between the printing mechanism and the platen, this holder being shown as comprising two vertical arms $v^6$ and preferably formed by the ends of the paper-guards $v^4$. This is done by passing the ends of the wire downwardly a suitable distance and then bending them upwardly, as shown, for instance, in Fig. 1.

It will be understood that various modifications of the device herein shown may be employed without departing from the spirit of my invention.

I claim as my invention the following-defined novel features, substantially as hereinbefore specified, namely:

1. In a type-writing machine, the combination with the printing mechanism, a series of keys operating said mechanism, and a carriage carrying a rack, of a dog moved by said keys and engaging said rack for controlling the movements of the carriage, a pivoted frame carrying said dog, a stop carried by said frame for limiting the movement of said dog in said frame, and a spring carried by said frame, bearing against said dog at its under side, the one having a depression and the other a projection entering said depression, whereby said dog may rotate in either direction against the action of said spring.

2. In a type-writing machine, the combination with the printing mechanism, a series of keys for operating said mechanism, and a carriage carrying a rack, of a pair of dogs moved by said keys and engaging said rack for controlling the movements of the carriage, a pivoted frame carrying said dogs, a stop carried by said frame for limiting the movement of said dogs in said frame, a spring carried by said frame, bearing against one of said dogs at its under side, whereby said dog may rotate in either direction against the action of said spring, and a spring for the other of said dogs fixed to said frame and acting normally to hold said dog against its stop.

3. In a type-writing machine, the combination with the printing mechanism, a series of keys for operating said mechanism, and a carriage carrying a rack, of a pair of dogs moved by said keys and engaging said rack for controlling the movements of the carriage, a pivoted frame carrying said dogs, a stop carried by said frame for limiting the movement of said dogs in said frame, a spring carried by said frame, bearing against one of said dogs at its under side, the one having a depression and the other a projection entering said depression, whereby said dog may rotate in either direction against the action of said spring, and a spring for the other of said dogs fixed to said frame and acting to normally hold said dog against its stop.

4. In a type-writing machine, the combination with the printing mechanism, a series of keys for operating said mechanism, and a carriage carrying a rack, of a pair of dogs moved by said keys and engaging said rack for limiting the movements of the carriage, a pivoted frame carrying said dogs, stops carried by said frame for limiting the movement of said dogs in said frame, one of said dogs having a depression at its under side, a spring fixed to said pivoted frame and having a bent portion entering said depression, whereby said dog may rotate in either direction against the action of said spring, and a second spring for normally holding said second dog against its stop.

5. In a type-writing machine, the combination with a series of key-levers, and a spacing-lever, of a universal bar formed as a tube, and rods connecting said bar with the spacing mechanism.

6. In a type-writing machine, the combination with a carriage, of a plate carried by the carriage, and having a plurality of notches, a stop device adapted to engage said notches, means for locking the printing mechanism during such engagement, and means for disengaging said parts.

7. In a type-writing machine, the combination with a carriage, of a plate carried by the carriage, and having a series of notches, a stop device adapted to engage said notches, and means for preventing such engagement of said device with any predetermined notch.

8. In a type-writing machine, the combination with a carriage, of a plate carried by said carriage, and having a series of notches, a second plate adjustable along said first-mentioned plate and having a notch movable into coincidence with different notches in said first plate, and a stop device movable into such notches of said plates as they coincide.

9. In a type-writing machine, the combination with a carriage, of a plate carried by said carriage, and having a series of notches, a second plate adjustable along said first-mentioned plate and having a series of notches spaced differently from those of the first, and a stop device movable into such notches of said plates as they coincide.

10. In a type-writing machine, the combination with a carriage, a plate carried thereby having a stop, a frame for supporting said carriage, a feed-dog coöperating with said carriage to control its movements, a lever for operating said dog, a detent pivoted to said frame, adapted to be engaged by said stop, and upon engagement therewith to engage said lever to stop the movement of said dog, and a rod extending to the front part of said frame, for releasing said lever from engagement with said detent.

11. In a type-writing machine, the combination with a carriage, a plate carried thereby and having a stop, a frame for supporting said carriage, a dog coöperating with said carriage to control its movements, a lever for operating said dog, a detent pivoted to said frame adapted to be engaged by said stop, and upon engagement therewith to engage said lever to stop the movement of said dog, a rod extending to the front part of said frame for moving said detent to release said lever from engagement therewith, and a catch moved by said rod, for engaging said lever, to hold said detent out of engagement therewith, whereby said detent is rendered inoperative until the next succeeding movement of the carriage, and its reëngagement with said stop is prevented.

12. In a type-writing machine, the combination with a carriage, of a stop adapted to limit the movement of the carriage in one direction for tabulating, and in the opposite direction for fixing the margin.

13. In a type-writing machine, the combination with a carriage, and a spacing mechanism, of a stop adapted to disconnect said spacing mechanism, and permit a rapid movement of the carriage, said stop adapted to be moved into the path of the carriage to limit its movement in one direction, and adapted to be moved into the path of the carriage to limit its movement in the opposite direction.

14. In a type-writing machine, the combination with a stationary frame, a carriage traveling along the top of said frame, and a transversely-oscillating spacing mechanism for controlling its movements, of a stop device sliding transversely across the top of said frame having a stop at its inner end and adapted to simultaneously move said spacing mechanism out of its operative position, and interpose its stop in the path of the carriage to limit its movement.

15. In a type-writing machine, the combination with a stationary frame, a carriage traveling along the top of said frame, and a transversely-oscillating spacing mechanism for controlling its movements, of a bar mounted independently of the carriage and adapted to be moved and to move said spacing mechanism out of its operative position, and a plurality of independently-operable stop devices sliding transversely across the top of said frame each having a stop at its inner end, and each adapted to interpose its stop in the path of said carriage for limiting its movement and to simultaneously move said bar to move said spacing mechanism out of its operative position.

16. In a type-writing machine, the combination with a stationary frame, a carriage traveling along the top of said frame, and a transversely-oscillating spacing mechanism for controlling its movements, of a stop device comprising a single movable part sliding transversely across the top of said frame, and projecting therethrough at its outer front end, and adapted when pressed rearwardly to interpose its inner end in the path of movement of the carriage, and to throw said spacing mechanism out of operative engagement with the carriage.

17. In a type-writing machine, the combination with a stationary frame, a carriage traveling along the top of said frame, and a transversely-oscillating spacing mechanism for controlling its movement, of a bar pivoted in said frame, and adapted to be moved to throw said spacing mechanism out of operative engagement with the carriage, a plurality of stop devices each comprising a single movable part sliding transversely across the top of said frame, projecting therethrough at its outer front end and spaced apart therein, and each adapted when pressed rearwardly to simultaneously move said bar and interpose its inner end in the path of movement of the carriage.

18. In a type-writing machine, the combination with a frame, a carriage and a spacing mechanism for controlling its movements, of a bar pivoted in said frame, and adapted to be moved to throw said spacing mechanism out of operation, a plurality of stop devices, each adapted to be moved longitudinally in said frame, and spaced apart therein, and each adapted to simultaneously move said bar and interpose a stop in the path of movement of the carriage, and a spring adapted to retract said stop device.

19. In a type-writing machine, the combination with the printing mechanism, of a carriage comprising a bottom plate, having angularly-bent end portions for forming bearings for the platen, one of said bent portions having a stop formed therein, and a line-spacing mechanism having a movable member adapted to engage said stop.

20. In a type-writing machine, the combination with a carriage, and a printing mechanism, of a holder between said carriage and printing mechanism for holding carbon-paper.

21. In a type-writing machine, the combination with a carriage, and a type-wheel, of a holder between said wheel and carriage, for holding carbon-paper in position to be struck by said type-wheel.

22. In a type-writing machine, the combination with a carriage, and a type-wheel, of a wire holder interposed between the two for holding carbon-paper.

23. In a type-writing machine, the combination with the printing mechanism, of a carriage, comprising a bottom plate, having angularly-bent end portions for forming bearings for the platen, one of said bent portions having a series of stops formed thereon, and a line-spacing mechanism having a movable member adapted to engage said stops.

24. In a type-writing machine, the combination with a printing mechanism, and a platen, of a series of fingers bearing against said platen, a rod bearing against said fingers, and a spring bearing against said rod for holding said fingers yieldingly against the platen.

25. In a type-writing machine, the combination with a printing mechanism, a carriage and a platen, of a series of fingers bearing against said platen, a rod bearing against said fingers, and a bow-spring on the carriage and bearing against said rod for holding said fingers yieldingly against the platen.

26. In a type-writing machine, the combination with the printing mechanism, a carriage, and a platen carried thereby, of a plate for guiding the paper to said platen, having formed integrally therewith a series of fingers extending around the platen for holding the paper thereto, and a rod fixed to said plate, and held in said carriage, whereby said plate and fingers are held in position.

27. In a type-writing machine, the combination with the printing mechanism, a carriage having slots formed therein, and a platen carried by said carriage, of a plate for guiding the paper to said platen, having formed integrally therewith a series of fingers extending around the platen for holding the paper thereto, and a rod fixed to said plate and held in said slots, whereby said fingers and rod may move relatively to the platen.

28. In a type-writing machine, the combination with a carriage, and a platen, of a series of spring-fingers extending around said platen for holding the paper thereto, and a paper-roller extending longitudinally of said platen, and pivots for said roll held in two of said fingers.

29. In a type-writing machine, the combination with a carriage, of a notched bar carried thereby, and a margin-stop slide carried by said bar, and comprising a block fitting said bar, a lever pivoted in said block having a portion for engaging said notches, and having a toe, and a spring fixed to said block and bearing against said toe for holding said lever in its engaging position.

30. In a type-writing machine, the combination with a frame, and a stop device carried thereby adapted to be operated to lock the printing mechanism, of a carriage having a plate formed integrally therewith, said plate having a stop adapted to engage said stop device to operate the latter.

31. In a spacing mechanism for a type-writing machine, the combination with the frame, of a spacer-bar formed with a groove at each end, and spacer-levers fulcrumed in the frame, and having their outer ends extending into said grooves in the spacer-bar.

32. In a spacing mechanism for a type-writing machine, the combination with the frame, of a spacer-bar formed with a groove at each end, spacer-levers fulcrumed in the frame, and having their outer ends extending into said grooves in the spacer-bar and pins holding said levers in said grooves.

33. In a type-writing machine, the combination with a printing mechanism of a spacing mechanism comprising a spacer-bar having a longitudinal groove at each end, and spacer-levers fulcrumed at their rear ends in the frame, and having their front ends bent angularly and confined in said grooves in the spacer-bar.

34. In a type-writing machine, the combination with a carriage having an antifriction-roller, of a top plate formed with a slot along which said carriage travels, and having a guideway for said roller formed integrally therewith.

35. In a type-writing machine, the combination with a carriage and mainspring-wheel, of a top plate supporting said carriage and having a depending lug for supporting said mainspring-wheel, whereby said carriage and wheel may be removed with said plate.

36. In a type-writing machine, the combination of a main frame, a top plate carried by said frame, a type-wheel extending above said top plate, and a carriage moving on said top plate and guides holding said carriage thereon, whereby the carriage may be removed with said plate.

37. In a type-writing machine, the combination with a bell and a bell-hammer, of a top plate having a projection formed thereon for supporting said parts, said projection having a slot forming a guide for said bell-hammer.

38. In a type-writing machine, the combination with a carriage, a mainspring-wheel for operating it, spacing mechanism and guides for said carriage, of a top plate carrying all of said parts, whereby said parts may be removed with said top plate by disconnecting the latter from its supports.

39. In a type-writing machine, a top plate formed with a slot constituting a carriage-way, and having a bearing for a spacing mechanism formed integrally therewith, bridging said slot and depending below the same.

40. In a type-writing machine, the combination with a frame, a carriage and a spacing mechanism for controlling its movements, of a top plate secured to said frame, a bar movable on said top plate and adapted to be moved to throw said spacing mechanism out of operative connection with said carriage, a series of stops having bearings in said top plate and adapted to move said bar and interpose a stop in the path of movement of the carriage, and a series of springs confined in said top plate for retracting said stops, whereby said stop mechanism is entirely carried by said top plate and may be removed therewith.

41. In a type-writing machine, the combination with a frame, a carriage movable thereon, and a type-wheel, of a scale fixed to said frame comprising two portions, the one extending to the left of the printing-point, and the other to the right thereof, and both arranged parallel to the path of movement of said carriage.

42. In a type-writing machine, the combination with a frame, and a scale-plate fixed thereto, comprising two portions, the one extending to the left of the printing-point, and the other extending to the right of said point, of a carriage moving on said frame, having two pointers for indicating the position of the carriage, the one moving along the left-hand portion of said scale and the other moving along the right-hand portion thereof.

43. In a type-writing machine the combination with a frame and a carriage, said carriage having a roller and said frame having a runway for said roller, of a scale-plate fixed to said frame, and having a portion extending over said runway, whereby said carriage is held against play in said frame.

In witness whereof I have hereunto signed my name in the presence of two subscribing witnesses.

RICHARD W. UHLIG.

Witnesses:
 EUGENE E. MYERS,
 FRED WHITE.